United States Patent
Shu (10) Patent No.: US 11,428,211 B1
(45) Date of Patent: Aug. 30, 2022

(54) VORTICAL WIND TURBINE/ UMBRELLA WAVE TURBINE SYSTEM

(71) Applicant: Jianchao Shu, Cypress, TX (US)

(72) Inventor: Jianchao Shu, Cypress, TX (US)

( * ) Notice: Subject to any disclaimer, the term of this patent is extended or adjusted under 35 U.S.C. 154(b) by 66 days.

(21) Appl. No.: 17/189,157

(22) Filed: Mar. 1, 2021

(51) Int. Cl.
| | |
|---|---|
| *F03D 13/20* | (2016.01) |
| *F03D 80/70* | (2016.01) |
| *F03D 1/06* | (2006.01) |
| *F03B 13/22* | (2006.01) |

(52) U.S. Cl.
CPC .............. *F03D 13/20* (2016.05); *F03B 13/22* (2013.01); *F03D 1/0675* (2013.01); *F03D 80/70* (2016.05); *F05B 2220/703* (2020.08); *F05B 2230/232* (2013.01); *F05B 2240/372* (2020.08); *F05B 2240/54* (2013.01); *F05B 2250/232* (2013.01); *F05B 2260/301* (2013.01); *F05B 2260/404* (2013.01)

(58) Field of Classification Search
CPC ........ F03D 13/20; F03D 1/0675; F03D 80/70; F05B 2240/54
USPC ..................................................... 290/44, 55
See application file for complete search history.

(56) References Cited

U.S. PATENT DOCUMENTS

| | | | |
|---|---|---|---|
| 8,264,096 B2* | 9/2012 | Micu ......................... | F03D 9/25 290/43 |
| 8,742,612 B1* | 6/2014 | Robbins .................... | F03D 1/00 290/55 |
| 2009/0267347 A1* | 10/2009 | Abatemarco ........... | F03B 13/10 290/43 |
| 2013/0140823 A1* | 6/2013 | Henry ....................... | F03B 3/04 290/53 |

OTHER PUBLICATIONS

Counter-rotating horizontal-axis (WO1992012343) Wind Turbine, Patentscope website, 1992. https://en.wikipedia.org/wiki/Unconventional_wind_turbines.

* cited by examiner

*Primary Examiner* — Charles Reid, Jr.

(57) ABSTRACT

This invention relates to a voluminous wind/wave turbine system, the turbine system has two wind/wave subsystems and is based on a unique volume process and optimized blades defining two power zones to harness wind and wave energy together or separately beyond the Betz limit, the vortical wind turbine subsystem has a pair of a front and back vortical blades to generate more power with satellite generators, the wave subsystem is a breakthrough for commercial applications and has a robust float vessel with toroid or polygonal pipes structure and multiple hinge mechanisms to hold multiple wave turbines against violent wave, the wave turbine has only a conversion to produce electricity constantly 24/7 with 360 degree freedom, the both subsystems are based on a shaft-less twin rotor turbomachinery and represent a new era of reliable and renewable energy at an unprecedented level of efficiency and the reliability.

6 Claims, 4 Drawing Sheets

VORTICAL WIND TURBINE/ UMBRELLA WAVE TURBINE SYSTEM

CROSS-REFERENCE TO RELATED APPLICATION

This application claims the benefit of provisional patent application Ser. No. 62/986,781 filed on Mar. 8, 2020 by the present inventor.

FEDERALLY SPONSORED RESEARCH

No

SEQUENCE LISTING OR PROGRAM

No

This invention relates to a voluminous wind/wave turbine system, the turbine system has two wind/wave subsystems and is based on a unique volume process and optimized blades defining two power zones to harness wind and wave energy together or separately beyond the Betz limit, the vortical wind turbine subsystem has a pair of a front and back vortical blades to generate more power with satellite generators, the wave subsystem is a breakthrough for commercial applications and has a robust float vessel with toroid or polygonal pipes structure and multiple hinge mechanisms to hold multiple wave turbines against violent wave, the wave turbine has only a conversion to produce electricity constantly 24/7 with 360 degree freedom the both subsystems are based on a shaft-less twin rotor turbomachinery and represent a new era of reliable and renewable energy at an unprecedented level of efficiency and the reliability.

The conventional wind turbine includes three or four front blades, a driving train, an power generator, a control and housing units and has the following problems (1) Low Efficiency. Since 1919, German physicist Albert Betz declared that the limit for the theoretical maximum efficiency for a wind turbine is 59% or a factor of 0.59. Today in 2021, more than 100 years later, we still cannot even reach the efficiency of 50%, even with all the powerful computation resources and sophisticated CFD models, and millions spent on building turbines. Most engineering books still tell us 0.40 as a practical efficiency of wind turbines, with the same limit being used for tidal or wave turbines. If we continue to do the same thing over the next 100 year, Mr. Betz would come out of the grave and laugh at us. Maybe the limit is not right, but if we cannot even reach at least 50% efficiency, or figure out what is wrong, the rest of the effort would be futile, the formula for wind turbine power should be P=½ p (A) CpV^3, Cp=fluid density, by now you know why the conventional turbine never reach even 50%. A=total area blade swept area (a) The swept area would not increase without physical change. (b) Wind speed or the stream speed of river or ocean is given by Mother Nature and cannot be increased by the turbines, so for all existing wind or wave turbines, in order to increase the out power, there is only one way to increase diameter of blades, there is no an innovation by the old way German physicist Albert Betz descripted 100 years ago (2) Safety issue includes injected broken blades, electrical fire and moving blades killing birds, and noise. Those issues cause public fear and even legal actions and disproval of turbine projects. The injected blades can hurt marine life or humans nearby and damage boats and float structures, the electrical fires are caused by overheating generators or short circuits, and this electrical fire can damage the turbines and can electrocute animals or humans, the noise is the biggest negative effect for human, marine life and animals in the long run. As we know from Navy sonar studies, it would hurt marine life and their reproductive abilities, and so far there are no solutions. According to the Natural Resources Defense Council, powerful underwater Offshore high power density fluid turbine system sounds produced by sonar can output sounds of more than 200 decibels, a level that spreads sound across the ocean and severely harms sound sensitive marine life like whales, more and more evidences show rotor blades kill birds (3) Turbine designs issue, they have not changed too much over time, with most of the knowledge coming from the aerospace industries, there have been no breakthroughs or big leaps since the first patent for gas turbines were filed in 1791 by John Barber. We see the solid shaft in every turbine around the world, from steam turbines to wind turbines. The inherent flaw in this design is that the central passage is blocked and restricts the flow. The same shaft unfortunately has also blocked our imagination for the past 250 years, they not only block the center passage to reduce flow rate about 5 to 10° % in comparison n with a full port passage, but also count for 10 to 25% rotating energy for heavy shaft, as we know, the larger the shaft, the more torque the shaft can generate, as well more energy the shaft wastes (4) inefficient blade design, If turbomachinery is the soul of all turbines, then the blade is the heart of the turbines. If blades do not work properly, any effort on the rest of the components would be futile. The blades of turbines are largely based on airplane blade design or propellers, while the wind turbine blades are inspired by bird wings, even with advanced simulations utilizing DEM method with advanced CFD, there have been no significant improvements, so what is wrong? the tip of blades cause turbulent and eddy flow and vibration due to the tip shape and blade structure, three unbalanced blades are located on one side and causes additional bending stress and vibration as well as wear out the bearing prematurely wearing off (5) vibration as the shaft speed up for 10 and 20 rpm with unsupported blade edges and unbalanced shaft weight under strong wind can cause uncontrollable vibrations, (6) bearing issue, the shaft is under both axial and radial load, since the bearing size is so small in comparison with lager diameter of blade of turbine, it is inherent problem in most cases, it is one of the main problems issue for broken down (7) overheat issue, the most wind turbine is equipped with a cooling system, it is part of energy waste (8) local restriction, the most wind farms are located in coastal areas, they need more expensive materials to deal with seal water corrosion issue as well structural integrity issue, so they are heavy investment, the most wind turbine is built with huge size structure in order to reach efficiency, so they occupy large land and are constructed with lot of materials like steal and cements as well as lot of labor in additional of environment and legal issue for the land usage, the irony is in the land rich states, very low electricity demand, while in city or high population regains have a fewer land for wind turbine farms, as well as legal challenges from local community (9) commercialization of wave turbines, so far, no commercial-scale wave power operations now exist, although a small-scale installation did operate off the coast of Portugal in 2008 and 2009. In February, U.S. corporate giant Lockheed Martin announced a joint venture to create the world's biggest wave energy project, a 62.5-megawatt installation slated for the coast of Australia that would produce enough power for 10,000 homes. Scotland, surrounded by the rough waters of the Atlantic and the North Sea, has become a hotbed of wave-energy research and development, with the government last year approving a 40-megawatt wave energy installation in the Shetland Islands. But a central challenge has proven to be the complexity of harnessing wave power, which has led to a host of designs, including writhing snake-like attenuators, bobbing buoys, even devices mounted discreetly on the ocean floor that work by exploiting differences in pressure as a wave passes by. Some devices generate the electricity on the spot and transmit it via undersea cables to shore, while others pass the mechanical energy of the wave along to land before turning it into electrical energy, the governments around the world spent millions on the wave energy developments, US departure of energy has funded $116, 270,344 on wave energy harnessing development between 2008-2014, what is the return? zero, what about Unite Kingdom, EU they failed too, the reasons for the failure are that all those designs started from wave not from turbine, so they become so complicated to convert the wave energy with at least four conversions between electrical generator and wave energy, those conversion mechanisms cannot survive in the server ocean conditions without constant repair or replacement, the commercial-no commercial-scale wave power operations are Just dream for now in 2021.

So the industry has long sought means of improving the performance of those machines by improving the efficiency without much success, the listed problems are still with us.

In conclusion, insofar as I am aware, no such a system is formerly developed with new machines to solve the problems.

SUMMARY

This invention provides a simple, robust, reliable and versatile turbine system based on shaft-less twin rotor turbomachinery, it provides renewable energy solution with wind as well as ocean wave energy to generate electrical power at much low cost, it is designed with the modulation, so vortical wind turbine as well as the wave turbine can be used together or separately, the vortical wind turbine is much compact about ⅔ or less in comparison with the conventional turbine but with the same amount of output, so they are deplorable in various places for different demands with various modules, while the wave turbine can be installed with existing coastal wind farms or deplorable with various modules, the wave turbine system has a simple, robust structure for the buoyant housing, the housing holding electrical control unit has multiple hinge to hold the wave turbine with 360 degree rotary freedom as well as wire the wave turbines and to generate electricity as long as the seawater pass the wave turbines regardless direction, because the wave turbine moves with the wave with 360 degree which are perpendicular to the wave turbine through port, so the wave turbine system is relative stationary to the wave turbine pass port, so the wave turbine can produce electricity constantly, finally the heart of the system is the shaft less twin rotor turbomachinery, it has the tubing rotor assembly as a single moving part include internal blade sets and external blade sets and generate radial fluid movements as well as axial fluid movements, this unpresented mechanism create new solutions for the challenges the conventional turbomachinery faced, the turbomachinery greatly reduce the weights and increase fluid capacity and efficiency and reliability.

Accordingly, besides objects and advantages of the present invention described in the above patent, several objects and advantages of the present invention are:

(a) To eliminate shaft for the turbomachinery, such a machine has no an obstacle in flow passage and much less weight and increase efficiency and reliability.

(b) To provide a compact and efficient wind turbine, so it can provide sufficient electricity for a local community at much lower cost with less weight and land usage and smaller size.

(c) To provide a vortical wind turbine with most robust, efficient blade design it has a larger effect diameter than the blade diameter, it is durable for specified number of usage with less maintenance, reliable feature and constructed with less material, turbulence with balanced structure, so the turbines are subject less side load and vibration.

(c) To provide an optimized flow characters of the turbine, such a turbine can produce a designed electricity.

(d) To provide seal device with ability to sustain rotary speed under high wave or wind. so such a seal device not only reduce the energy waste but also prevent seawater or rain to corrode the internal parts of the turbine.

(e) To provide a universal bearing, such a bearing can support radial as well as axial loads and can be sealed and self-lubricated, so the bearing can stand for high side load under high wind or wave and be easily installed and replaced under a designed period.

(h) To provide a commercially available and workable wave energy system, such a system can provide sufficient electricity with a simple, low cost and robust structure, it can be retrofitted with existing ocean wind farm as well as an independent unit and can be deployed to coastal area or fixed vehicles or constructions in the server sea or river conditions.

(j) To provide a thermal efficient machine, so the machine can produce more energy at the highest efficiency with simple structures and materials, less or no cooling system Still further objects and advantages will become apparent from study of the following description and the accompanying drawings.

DRAWINGS

Drawing Figures

DESCRIPTION

FIGS. 1-16 illustrate a wave/wind turbine system 10 has a wave turbine subsystem 40 with multiple shaft-less twin rotor turbines 100, one vortical wind turbine subsystem 20 with a shaft-less twin rotor turbine 100a and a support tower 21 and three anchors 48 for producing electricity by harnessing wind, raining, wave and tidal energy as a renewable power source.

Referring FIGS. 2-6, the wind turbine subsystem 110a has at least two ball bearings 190, two seal ring assemblies 180, a body assembly 102a having a main port 105a defined by an inlet port 104a and an outlet port 104a', a twin tubing rotor assembly 150a movably disposed in the body assembly 102a has a left rotor 103a, a right rotor 103a' and a union 152a with internal blades 168a, the body assembly 102a has a left body assembly 108a having a left rotor bore 116a engaged with the left rotor 103a to form a first left chamber 160a and a second left chamber 162a and a right body assembly 108a' having a right rotor bore 116a' engaged with the right rotor 103a' to form a first right chamber 160' and a second right chamber 162a', the second left chamber 162a and the second left chamber 162a' can be constructed together or separately, the left body assembly 108a has a a front fixed wheel 118a having multiple satellite electrical devices 117, each satellite electrical devices 117 has a satellite gear ring 119, while the right body assembly 108a' has a front fixed wheel 118a' having multiple satellite electrical devices 117, the left rotor 103a has a front rotary wheel 153 with helical blades 156a and a segment ring 155a having multiple blades 154a, each blade 154a has a C tip 155a to prevent eddy flows and a back rotary wheel 169a with a gear ring respectively engaged with the satellite gear rings 119, so the satellite electrical devices 117 eliminate the troublesome large gearbox in the conventional wind turbine, so they can be modulated, the first left chamber 160a, the first right chamber 160a' can be used to circulate incoming air with additional external rotary wheel with blades as cooling chamber for the electrical devices.

Each of the rotors 103a, 103a' is respectively disposed in the left body assembly 108a and the right body assembly 108a', the union 152 a with a set of internal blades 168a supports both the rotors 103a, 103a' statically or dynamically, the union 152a is a key for product modulation, each rotors 103a, 103a' housings can be made as standard products, then based on applications, the union 152a can be increased or decreased by the length or inside diameter or outside diameter and constructed as an integral part by welding, press fit gluing or with one or two ball bearings 190 for independent control of the rotors 103a, 103a' or with a magnetic coupling in a hybrid manner, the union 152a can be made out of different materials form that of the rotors 103, 103', the right rotor 103' has the same arrangement as the left tubing rotor 103, the union 152a can be constructed to support statically the rotors 103a, 103a' as an integral component, or as an independent part to support both the rotors 103a, 103a' with two ball bearings 190 dynamically or in a hybrid manner with magnetic coupling, when left incoming winds flow at the inlet 104a dividing into three streams, a first stream flow through main bore 105a to both rotor 103a, 103a', a second stream flows through blades 156a to drive the left rotor 103a and right rotor 103a' a third stream flows through blades 154a, 154a' to drive the left rotor 103a, the right rotor 103a', so if the left rotor 103a rotates clockwise with left hand blade and the right rotor 103a' rotates anticlockwise with right hand blades, then a pair of rotary streams is formed, according the Newtown third law, so the left rotor 103a and the right rotor 103a' would have similar speed or the same speed, if they are identical, the efficiency can reach 85%, moreover the blades 156a and 154a would generate vortical wind stream in the inlet 104a, so a diameter of the vortical wind stream is much larger than a diameter of wheel 153a, there is no a single wind turbine in the world has the those features and benefits.

Figure 1:
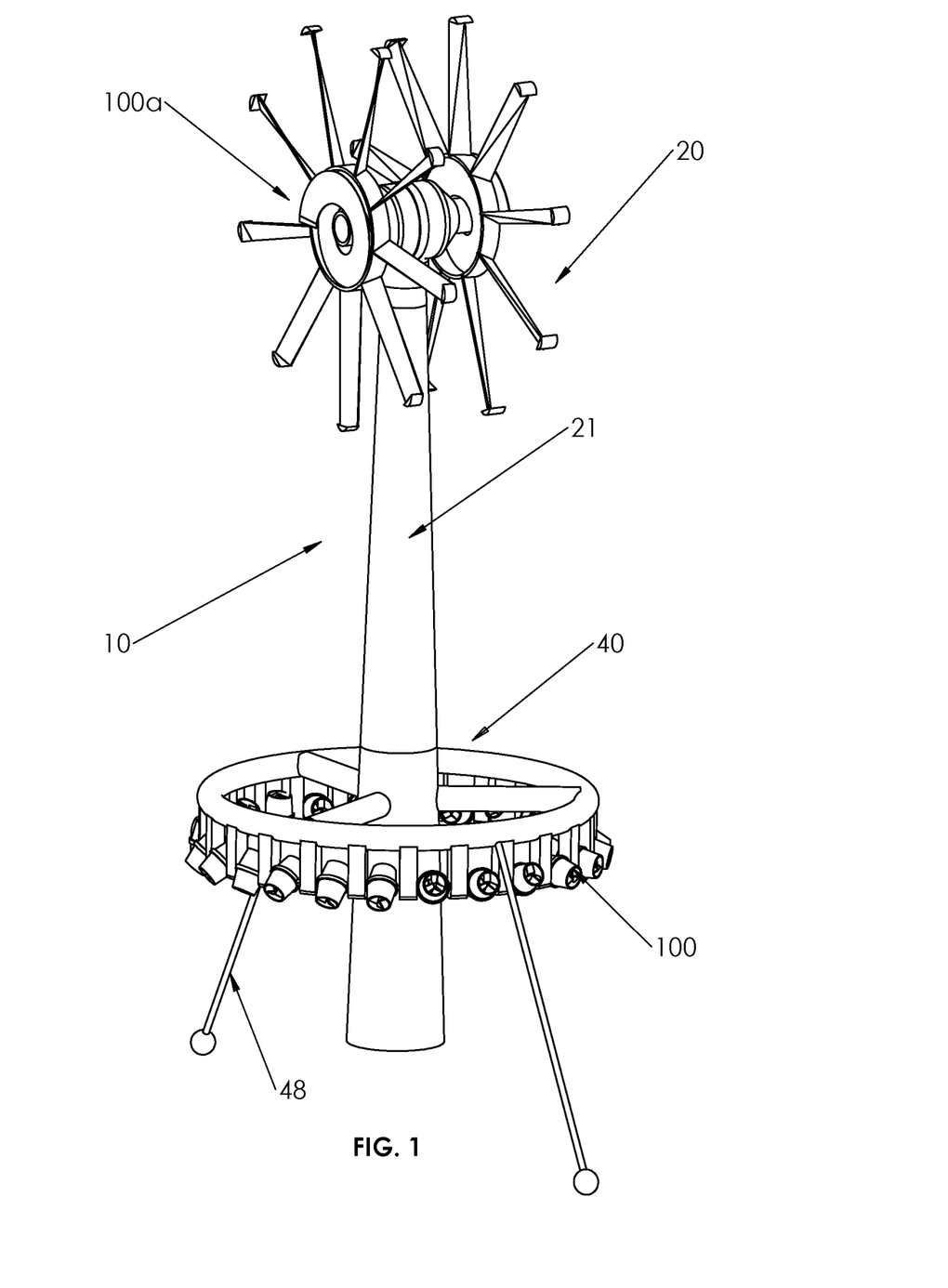
FIG. 1 is an ISO view of a wave/wind turbine system with one wind turbine and one wave turbine system for harnessing wind and wave energies constructed in accordance with this invention.
Figure 2:
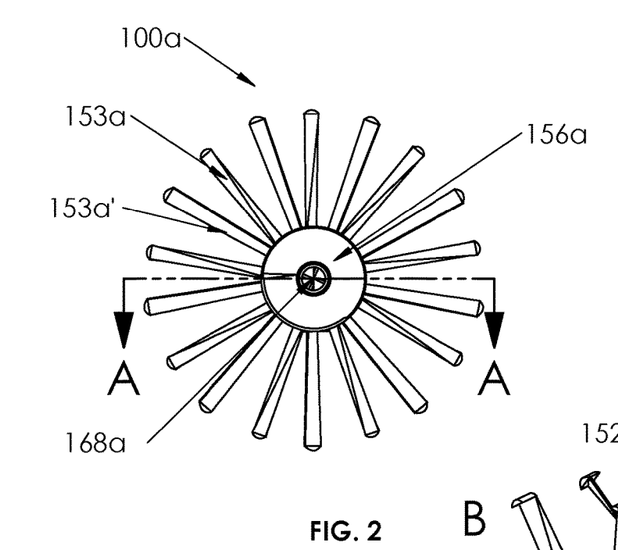
FIG. 2 is a front view of the wind turbine FIG. 1
Figure 3:
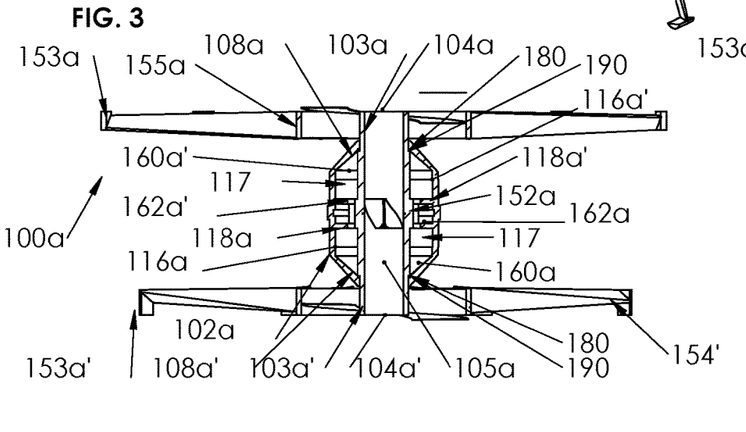
FIG. 3 is a cross sectional view of wind turbine of FIG. 2 along line A-A.
Figure 4:
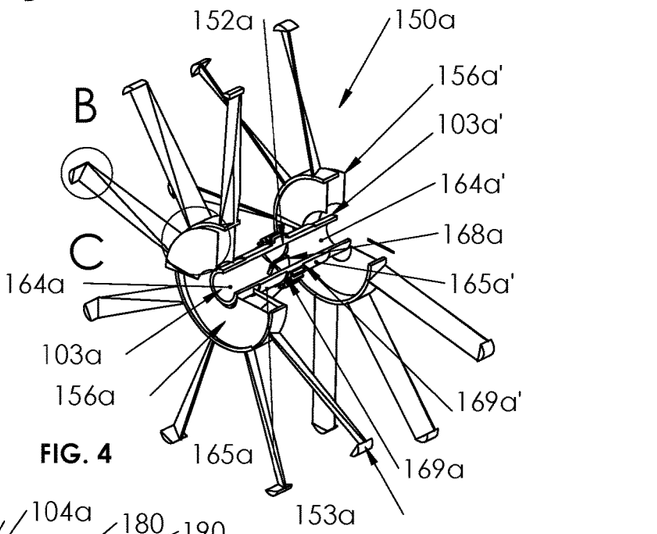
FIG. 4 an ISO view of tubing rotor assembly FIG. 2.
Figure 5:
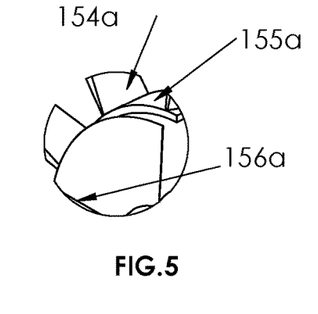
FIG. 5 is a "C" detail views of blades and joint ring of FIG. 4
Figure 6:
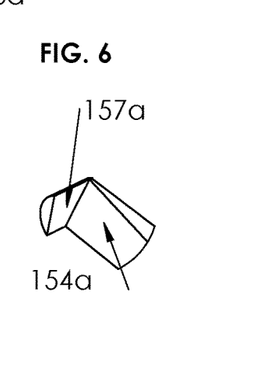
FIG. 6 is a "B" detail views of blades of FIG. 4.
Figure 6A:
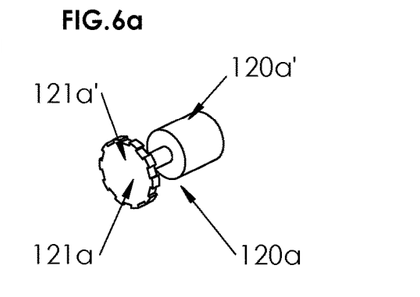
FIG. 6a is an ISO view of an satellite geared electrical generator of FIG. 4.
Figure 7:
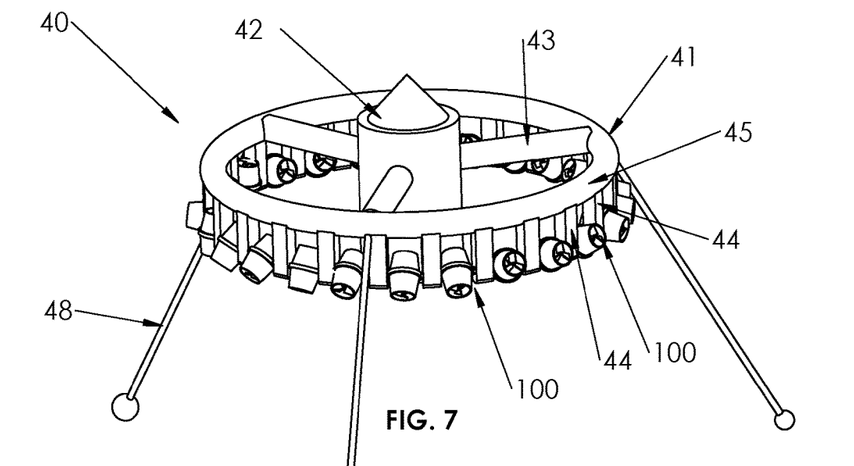
FIG. 7 is a ISO view of wave turbine system FIG. 1.
Figure 8:
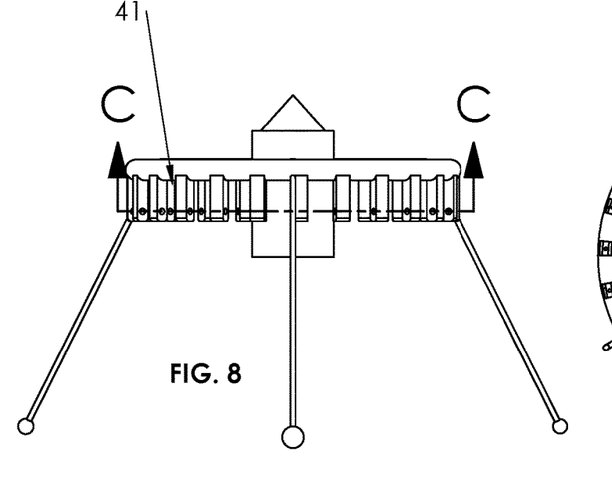
FIG. 8 is a front view of the wave turbine system FIG. 1
Figure 9:
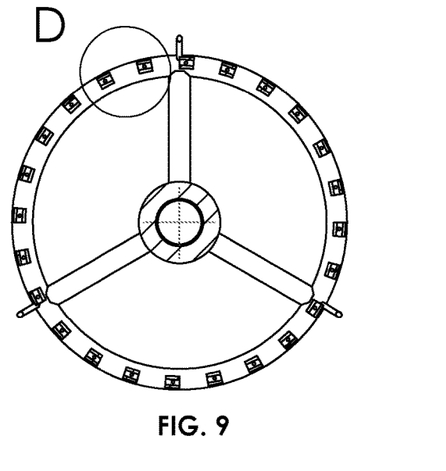
FIG. 9 is a cross sectional view of turbine system FIG. 8 along line C-C.
Figure 10:
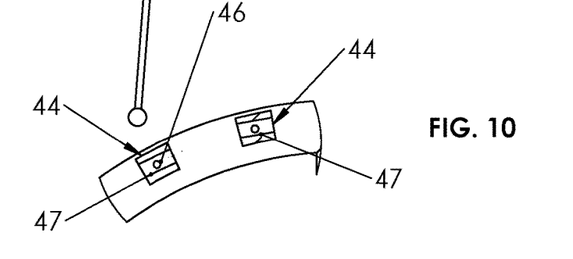
FIG. 10 is a "D" detail views of turbine system hinge of FIG. 9.
Figure 11:
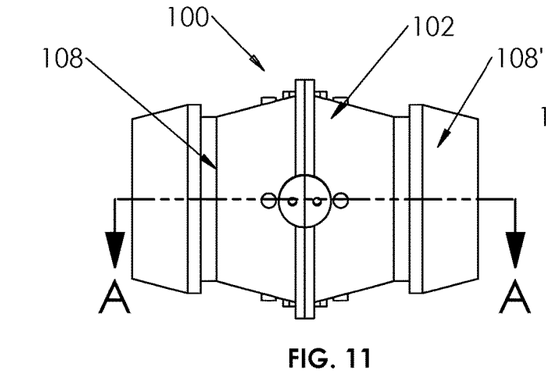
FIG. 11 is a front view of an wave turbine system of FIG. 1
Figure 12:
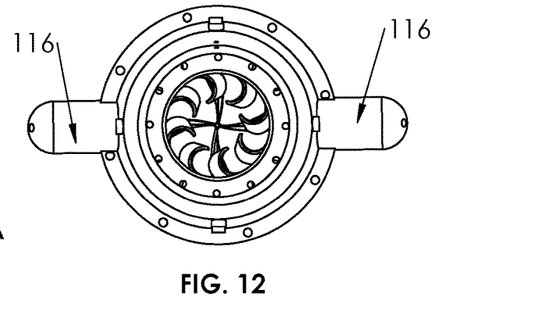
FIG. 12 is a side view of wave turbine system of FIG. 11
Figure 13:
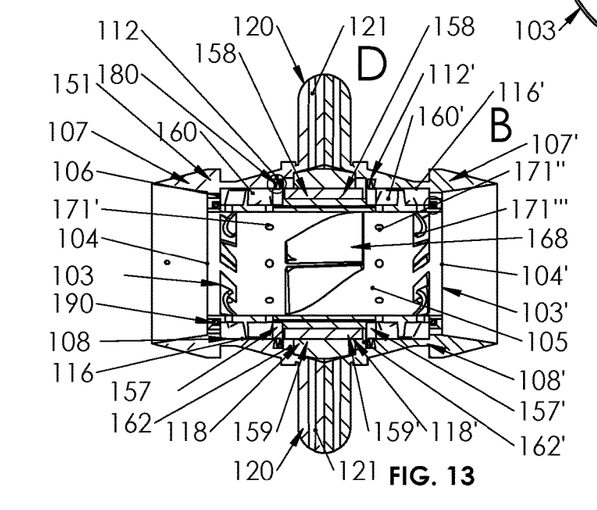
FIG. 13 is a cross sectional view of the system of FIG. 11 along line A-A.
Figure 14:
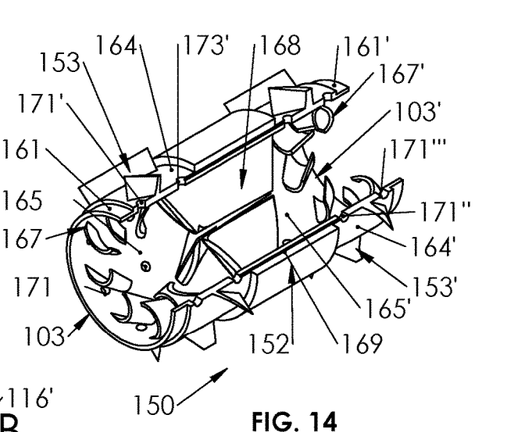
FIG. 14 is an ISO, cut view of a tubing rotor assembly of FIG. 11

Referring FIGS. 7-16, the wave turbine subsystem 40 includes a float housing assembly 41, a tower adapter 42, three anchors 47 to hold the wave turbine system 140 regardless if the tower 21 is float or not, and multiple wave turbines 100, the tower adapter 42 has an electrical control hub extending to a float vessel 45 by linked hollow bars 43, the float vessel 45 generates buoyance with contained gas, and has multiple hinges holders 44, the float vessel 45 has many structures including toroid pipes and polygonal pipes, each hinge holder 44 has a hinge hole 47 and wire hole 46 extending to the float vessel 45 so electrical wires can pass from the tower adapter 42 to each wave turbine 100, the hinges holders 44 can be constructed with the float vessel 45 statically or rotatably, the float vessel has the strongest structures against the violent wave impact among all existing wave turbine and not only provide the buoyancy, but also has more mobility to harness wave energy in all directions, the wave turbine 100 includes one joint shaft 120 disposed in the hinge hole 46 or two joint shafts 120 disposed respectively in the hinge holes 46 between hinge holders 44, so each of the wave turbines 100 can rotate 360 degree with two hinge holes 46, or each of the wave turbines 100 can rotate 360 degree with one hinge hole 46 and rotate 360 degree around a rotatable hinge holder 44, the wave turbines 100 can generate power constantly 24/7 as long as submerged into wave water, and a length of the wave turbine 100 is shorter than a length of the wave, a diameter of the turbine 100 is shorter than the wave height, moreover the two ratios between the wave and the turbines 100 are so large, so almost every wave turbine 100 in the float vessel 45 can generate full power regardless of direction of the wave, so far there is no single wave turbine in the world with the simple, robust mechanism with only one conversion between liquid wave and an electrical generator!!

the wave turbine comprises at least two ball bearings 190, two seal ring assemblies 180, a body assembly 102 having a main port 105 defined by an inlet port 104 and an outlet port 104' and a left electrical device 117 having a left electrical stator 159 and a left electrical rotor 158, and a right electrical device 117' having a right electrical stator 159 and a right electrical rotor 158, a twin tubing rotor assembly 150 movably disposed in the body assembly 102 has a left rotor 103, a right rotor 103' and a union 152 with multiple axial holes 169 between the left rotor 103 and the right rotor 103', the body assembly 102 has a left body assembly 108 having a left rotor bore 116 engaged with the left rotor 103 to form a first left chamber 160 and a second left chamber 162 to receive the left electrical device 117, and a right body assembly 108' having a right rotor bore 116' engaged with the right rotor 103' to form a first right chamber 160' and a second right chamber 162' to receive the right electrical device 117', the second left chamber 162 and the second left chamber 162' can be constructed together or separately, the left body assembly 108 has a bearing bore 110, a seal ring bore 112, a front fixed wheel 118 with the electrical stator 159, while the right body assembly 108' has a bearing step bore 110', a seal ring bore 112', a front fixed wheel 118' with the electrical stator 159' the left rotor 103 has a step bore 170 with a left wall 157 and a front external rotary wheel 153 with multiple blades in the first left rotor chamber 160, a back external rotary wheel 158 with the electrical rotor engaged with the electrical stator 158 in the second left rotor chamber 162, and the right rotor 103' has the same arrangement as the left tubing rotor 103, the union 152 can be constructed to support statically the rotors 103, 103' as an integral component, or as an independent part to support both the rotors 103, 103' with two ball bearings 190 dynamically or in a hybrid manner with magnetic coupling, in addition the front external rotary wheel 153 and a back external rotary wheel 158 can switch positions between the first left rotor chamber 160 and the second left rotor chamber 162, so the right front external rotary wheel 153' and a back external rotary wheel 158' can do the same, the left body assembly 108 has a conical extension 107 having multiple high power holes 106 between the extension 107 and the first left rotor chamber 160 or the second left rotor chamber 162, the right body assembly 108' has a conical extension 107' having multiple high power holes 106' between the extension 107' and the first right rotor chamber 160' or the second right rotor chamber 162'

Each of the rotors 103, 103' is respectively disposed in the left body assembly 108 and the right body assembly 108', the union 152 with a set of internal blades 168 supports both the rotors 103, 103' statically to impel incoming flows or dynamically to mix incoming flows, the union 152 is a key for product modulation, each rotors 103, 103' housings can be made as standard products, then based on applications, the union 152 can be increased or decreased by the length or inside diameter or outside diameter and constructed as an integral part by welding, press fit gluing or with one or two ball bearings 190 for independent control of the rotors 103, 103' or with a magnetic coupling in a hybrid manner, the union 152 can be made out of different materials form that of the rotors 103.

Tests for this invention were conducted with a conventional rotor having range of 1 to 12 blades, there are two extreme cases, (1) as the rotor speeds up with the 12 blades, the blades soon become a wall, so there is almost no flow to pass (2) while the rotor speeds up with 0 to 1 blade, there is almost no flow to pass due to lack of converting power from the rotor, why did the rotor cause the two results? because the conventional rotor is designed to add blade angularly so when the rotor speed up, eventually the number of blades would block the flow path, the same problems happen in the wind turbine blades as well as marine propeller blades, moreover if the rotor convert all 100% given power to the flow, then the rotor would stop, so the conventional rotor never reach high efficiency more than 50% to 55%.

The two zones are radially designed and solve the conventional rotor inherent problem, the high power zone is designed to pass high power flow from a large part of diameter of the blades 167 and more number of blade, which generate more power, some of the incoming flows is impelled up into the first left rotor chamber 160 through the radial holes 171, some of the incoming flows is impelled forward in the main port 105 in the low power zone, while the left rotor 103 also has multiple radial holes 171' and the left rotary wheel with axial blades 153 on an external surface 164 to further impeller the upcoming flow in the first rotor chamber 160, then push back into the main port 105 through the radial holes 171', then the high velocity flow get back into the low power zone, so a perfect vortical flow is formed between the inlet 104 and the radial holes 171' as the rotor 103 speeds up with 80% to 90 of input wave power, the pressure gradient is formed between the low power zone and high power zone according to Bernoulli equation, as a result the rotor 103 would suck more flows than the diameter of main port 105 with the conical extension 106, so incoming flows pass the union 152 either with or without a mixer 168 and reach at the right rotor 103', the whole process repeats again like in the left rotor 103, the incoming flows reach at the first right chamber 160' through radial holes 171'' as well as the axial holes 152 and are impelled through blades 153' as well as pass blades 167', and become a high pressurized and high flow rate outgoing flows, due to the flow streams from radial holes 171''' at the outlet 104' with the extension 106', the incoming flow fast expand, more powerful feature is that the blades wheel 167 and the blades wheel 167' can be constructed respectively with left or right or one left and one right, so if the rotor 103 rotor rotates clockwise with the left blades wheel 167, while the rotor 103' rotates anticlockwise with the right blade wheel 167', the incoming flows would pass from the inlet 104 to the outlet 104', if the arrangement is the other way around, then the incoming flows would pass from the outlet 104' to the inlet 104, why it is so important feature, because it would great reduce noise, vibration and cavitation as well as wake rotation in the downstream to disturb sea wile life.

A seal test for this invention was conducted with a tester having a cylinder bore engaged with a shaft by a radial gap, the tester has an inlet end with a pressurized fluid and a an outlet end (pressure=force/area=force×distance/area× distance=work/volume of the gap=a fluid work density), so we know the leak of flow because the flow does the work, so if the flow does not work, there is no leak !, now we know there are two conditions which cause leak together, a gap and a pressure difference, the test was conducted with the tester having a conical bore engaged with a conical shaft by a radial gap, the shaft is driven by a motor, as the motor speed up or the conical angle increase or the gap reduces, the pressurized fluid would move slower and slower from the inlet to the out let and eventually stop.

Figure 15:
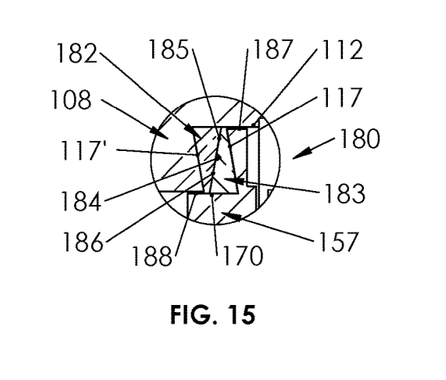
FIG. 15 is a "D" detail view of seal ring assembly of the assembly of FIG. 14.

The left rotor 103 has a left wall 157 with a bore 170 between the first left chamber 160 and the second left chamber 162, the right rotor 103' has a right wall 157' with a bore 170' between the first right chamber 160' and the second right chamber 162', one of the seal assemblies 180 is disposed between the bore 170' and a body bore 112' of the right body assembly 108', the seal ring assembly 180 has at least one fixed V seal ring 182 with a conical surface 185 and at least one dynamic V seal ring 183 with a mated conical surface 186 engaged with the surface 185 in axial directions for dynamic seals, the fixed V seal ring 182 installed with the seal ring bore 112 of the body assembly 108 with a press fit has a low gap 188 with the step bore 170' of the right wall 159', the dynamic V seal ring 183 installed with the right wall 159' with a press fit has a top gap 187 with the bore 112, the seal ring assembly 180 has at least one groove 184 between the fixed seal ring 182 and the dynamitic seal ring 183 to collect fluid or sealant, in addition, a second of the V seal rings 183, 182 can be added to provide spring functions or heat exchange, so as the rotor 103' rotates, the fixed seal ring 182 stays with the body assembly 108', while the dynamic seal ring 183 stays with the rotator 103', there are three factors; centrifugal force, tangential speed, rotational speed with the dynamic V seal ring 183, a speed of OD of seal rings 182, 183 is more higher than that of ID of seal ring 182, 183, the rotors 103, 103 is defined by X and Y directions, X is an axle of the rotors 103 and 103, the centrifugal force is defined by Y direction, the interface between V wedge rings 182, 183 is defined by an angle from X, as the seal test indicates as the angle change away from Y direction, the leakage gradually stops, so the dynamic V seal ring 183 would not carry fluid without any blade when rotating, while the Fixed V seal rings 182 is stationary, there is no stable gap to be established, moreover the boundary layers of fluid on seal rings 182, 183 would remain, as Bernoulli's equation states that higher speed, lower the pressure, so the fluid in the top gap 187 would not go to the low gap 188 due to a negative pressure gradient, while the fluid at the low gap 188 can go to the top gap 187, but it must get through the interfaces between surfaces 185 and 186, there is a little mass of the fluid to be effected by the centrifugal force or fluid pressure, or the fluid can do a little work, as we know the formula (pressure=force/area=force×distance/area×distance=work/volume of the gap), it would not move up, moreover the groove 184 is a fluid equalizer, so even the fluid passing through the low gap 188 would stay at the groove 184 due to fluid surface tension, if the fluid is a gas, then sealant between surfaces 185 and 186 would provide liquid seal as well, sealant can be used for high temperature or cryogenic conditions, so no fluid can leak from top gap 187 to low gap 188 or vice versa, the seal assembly 180 is a positive seal to sustain loads and can be used as a static seal in high vibration applications, while most of spring energized seal ring or shroud seal ring cannot sustain the severe loading even for static seals in high speed or high vibration machines, because they just cannot keep constantly seal contract around 360 degree or pulse dynamic leakage.

Figure 16:
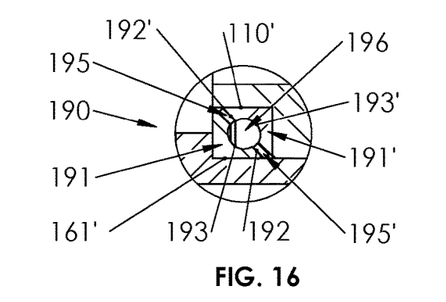
FIG. 16 is a "D" detail view of a bearing of the assembly of FIG. 14.

The left body assembly 108 has a bearing bore 110, the left rotor 103 has a step bore 161, the right body assembly 108' has a bearing bore 110', the right rotor 103' has a step bore 161', the two ball bearings 190 are respectively disposed between the bearing bore 110 and the step bore 161 and between the bearing bore 110' and the step bore 161', the ball bearing 190 has a left ring 191 and a right ring 191' and multiple balls 196, a left wedge insert ring 195 and right wedge insert ring 195', the left ring 191 has a conical surface 192 and a ball groove 193, the right ring 191' has a conical surface 192' and a ball groove 193', the multiple balls 196 are disposed between ball grooves 193',193, the left insert ring 195 and the right insert ring 195' respectively disposed between wedge surfaces 192, 192' have at least one set of round slots to position the balls 196, the insert rings 195, 195' are made out of soft materials including bronze, aluminum, engineering plastics with sealant or grease or the fluid like lox or fuel are placed between left ring and right rings 191, 191', as the twin tubing rotor assembly 150 rotates, insert ring 195, 195' are disposed between the rings 191, 191' to prevent sealant or grease 199 or other fluids from coming out, the seal theory is the similar to seal ring assembly 190, so the ball bearing 190 not only can support radial and axial loads, but also provide seals, additionally because diameter of the step bore 161 is much larger than any shaft diameter, so there are more balls, more contact surfaces to support loads than the conventional ball bearing, the overheat and vibration are eliminated or reduced greatly.

Although the description above contains many specifications, these should not be construed as limiting the scope of the invention but as merely providing illustration of some of the presently preferred embodiments of this invention.

Thus, the scope of the invention should be determined by the appended claims and their legal equivalents, rather than by the examples given.

Conclusion and Impact

First, the shaft less twin rotor turbine has the highest power density and efficiency over the conventional wind or wave turbines, if we use the same length and the diameter to design both the conventional turbines e and this turbomachine, this turbomachine is a clear winner, because the conventional turbomachine is an area base machine, this turbomachine is a volume base machine, so it produces more power, for the wind turbine, it pass the Betz limit, it can use up 75 to 95% input power without negative effect, because the pair of clockwise and anticlockwise of floe streams between the left rotor 103a and the right rotor 103a', this wind turbine provide the best performance ever with high efficiency greater than 59% as a new benchmark and a high density power by disruptive innovation beyond imagination. The age old Power=½ Cp $A*V^3$ should become P=½ Cp $(A-A1)* V^3$ to express true power and validate all turbines in the market. With this innovative design, the center area is open to allow more flow, the area doubles A. Total=A×2 due to the twin rotors, A and V become even larger due to the vortical mechanism resulting in the highest power. For the conventional turbines, A and V were unchangeable for a given turbines due to the physical size and natural stream velocity, moreover the area-based power generation has low density, wasting a lot of materials and space, while a volume-based power generation has high power density, so Power density=$P*L/A*L$, L=length, $P*L$=work, $A*L$=volume, all those innovative features create an efficiency leap this turbine can use up 85% of the converting power, because there is no flow blockage issue at the center lower zone regardless the speed of rotor or number of blades, the peak performance would be obtained in a much easy way with a pair of clockwise rotary fluid stream and an anticlockwise rotary fluid stream and with the high power fluid in the high power zone and high flow rate at the low power zone, this turbines fully uses up the total volume from the center thrust bore at low power and high power zone, those turbines have revolved the fundamental problems the conventional turbines faced with and even surpass in all, as the following; (a) Shaft less design, it profoundly change the history of turbomachinery, from drivetrain to blade designs. First the shaft less design open up the center passage to the top limit and replace the shaft with tubing rotor, second according to the Machinery's Handbook 27th Edition at page 307 Example: A 4-inch shaft, with a 2-inch hole through it, has a weight 25 percent less than a solid 4-inch shaft, but its strength is decreased only 6.25 percent.

(2) Drive train design. Drive trains include first "one to one" type, it has the simplest conversion with the smart drive train between turbine rotor/electrical rotor to electrical stator, again because of shaft-less turbomachine technology, so twin wave turbine with the shaft-less turbomachine technology become only commercially suitable wave turbine, second one is one to many type and has 3 conversions from the rotor to multiple satellite so it replaces the troublesome gearbox, the drive train can act as a resultant transmission, it not only optimize input with output, eliminate pitch control system, but also revolve overheat issue with natural water cooling system and eliminate the electrical cooling system and the brake system, finally wave fluid or wind can flow both directions front or back and generate power.

(3) Blades design. Dual energy zone technology is a game changer, it broke all rules based on wing and lift theories with a goal to maximize output torque and minimizing material and drag. So many contrast features between the bladed ring and conventional individual blade from "a central hole v. a center block", "a root ring v. a large root", "a large tip mass and area v. small mass and area" and "radical division v angular division". Solid blade vs. hallow blade. The bottom line is (a) that bladed ring to maximize output torque from the fluid energy in the high energy zone and release the used fluid in the low energy zone, the blades to minimize torque in high energy zone, maximize torque between high energy zone and low energy zone, and release used fluid at high energy zone (2) the bladed ring against a single blade is designed in a synergic manner, so it greatly reduce materials and increase strength and efficiency (3) the ring structured blades not eliminate tip eddy but also make modular design possible to reduce cost and more blades possible in high energy zone to make it more efficient.

(4) Safety issue

All safety issues are addressed with solutions, the drive train under abnormal conditions, two safety barriers and satellite electrical devices are design to protect the vertical turbine from high wind by control number of satellite electrical devices self-starting design, while the risk of electrical fires are minimized by two sealing solution and cooling systems, Y seal ring assembly and sealable bearings are designed to provide robust seals to prevent shaft dynamical leaks in bi-direction, while cooling chamber blades acts fan to cooling the electrical devices and eliminate any hydraulic fluid fire. It provided with the best natural cooling solution. the noise and turbulent wakes are greatly reduced by the twin rotors and bladed rings with C type tips Finally the wind turbine with bladed rings as well as the vertical turbines would great reduce the risk of killing birds.

(5) scalability. The modular design lays a foundation for scalability of all turbine parts and productions, all rotor and bladed ring sizes, nacelles and drive trains are based on the existing ASME and API pipe schedule, so they have much low cost and high availability with existing supply chains and facilities.

(6) Usability include sustainability and sealabilty 4.1 Sustainability The shaft less twin rotor wave turbine has two key sustainable features: the single conversion and the float vessel has toroid pipe assemblies and polygonal pipe assemblies with hinge joint, those features can make the turbine sustainable for severe river or ocean conditions, turbine base can compare with, 4.2 Sealabilty The sealabilty is provided with Y seal ring and the sealable ball bearings, the sealable ball bearings not only resolve dynamic leakage on the rotors but also the weather seal for the wind turbines against rain, snow or sand wind.

(7) Profitability is a key for commercial success (A) High scalability is based on the modular design for a single part, single turbine or single turbine system, they are all scalable. The rotor, alternator, gear train designs are based on a few basic sizes, so the tooling, fixtures, inventory can be reduced greatly.

(B) Economics of scale Instead of a large turbine, this turbine system includes multiple small turbines, the cost as well as LCOE would be reduced as the number of part produced increase from one to 24 or 48 or 100. As an example 5 Mw turbines can be made with multiple 100 Kw, 500 Kw, 1000 Kw or 1 Mw small turbines.

(C) Synergy cost Every turbine system shares a control box and cables, in and out inverters, tower and electrical devices, every wave turbine shares the same base assembly, each rotor assembly shares the same nacelle, every rotor share the same union.

I claim:

1. A turbine system comprising at least one subsystem, the at least one subsystem has at least one turbine, the at least one turbine comprising a body assembly, a twin tubing rotor assembly movably disposed in said body assembly by means of at least two ball bearings disposed between said twin tubing rotor assembly and said body assembly for providing dynamic supports, and by means of at least two seal assemblies disposed between said twin tubing rotor assembly and said body assembly for providing seals, said body assembly has a left body assembly having at least one fixed wheel and a body bore and a right body assembly having at least one fixed wheel and a body bore, said left body assembly has one of a plurality of structures including a one piece structure and a two-piece structure, said right body assembly has one of a plurality of structures including a one piece structure and a two-piece structure, said twin tubing rotor assembly has a left rotor having a tubing housing having at least one internal rotary wheel and at least one external rotary wheel and a tubing bore, a right rotor having a tubing housing having at least one internal rotary wheel and at least one external rotary wheel and a tubing bore, and a union to support said left rotor and said right rotor, said union has one of a plurality of supporting methods including (1) two static supports (2) two dynamic supports (3) one static support and one dynamic support (4) at least one hybrid support, said static support is defined by one of plurality of methods including welding, press fitting, gluing and bolting, said dynamic support is defined by one of the at least two ball bearings disposed between said union and one of said left rotor and said right rotor, the at least one hybrid support is defined by a magnetic coupling each of the at least two ball bearings has a left ring and a right ring and multiple balls disposed between said left ring and said right ring, a left wedge insert ring and a right wedge insert ring respectively disposed between said left ring and said right ring, said left ring has a left conical surface and a left ball groove, said right ring has a right conical surface and a right ball groove, said multiple balls are respectively engaged with said left ball groove and said right ball groove, said left insert ring and said right insert ring are respectively disposed between said left conical surface and said right conical surface, said left ring and said right ring have one of a plurality of materials including magnetic materials and nonmagnetic materials, the at least two ball bearings has fluids for providing seals, each of the at least two seal ring assemblies disposed between said tubing bore and said body bore with press fits has at least one fixed V shape seal ring having a conical surface and at least one dynamic V seal ring having a mated conical surface engaged with said conical surface of the at least one fixed V shape seal ring in one of a plurality of methods including an axial method and a radial method for providing dynamic as well as static seals, said each of the at least two seal ring assemblies has a top gap defined by said body bore and the at least one dynamic V shape seal ring, and a low gap defined by said tubing bore and the at least one fixed V shape seal ring, said each of the at least two seal ring assemblies has at least one groove between the at least one fixed V shape seal ring and the at least one dynamic V shape seal ring, said turbine system has at least one of a plurality of power supplies including (a) wind power (b) raining power (c) wave power (d) tidal power (e) river stream power (f) any natural fluid stream, said turbine system has at least one electrical device having an electrical stator and an electrical rotor.

2. The turbine system of claim 1, wherein the at least one subsystem has a support tower and the at least one turbine having said body assembly having a main port defined by an inlet port, an outlet port and the at least one electrical device, said left body assembly has a left rotor bore receiving said left rotor to form a first left rotor chamber and a second left rotor chamber to receive the at least one electrical device said right assembly has a right rotor bore receiving said right rotor to form a first right rotor chamber and a second right rotor chamber to receive the at least one electrical device, said left body assembly has a first of the at least one fixed wheel said left rotor has a first of the at least one internal rotary wheel having blades with an inside diameter dividing said main port into a high power zone and a lower power zone between said inlet port and said outlet port, and a first of the at least one external rotary wheel having a first set of blades and a segment ring having a second set of blades, each of said second set blades has a C shape tip, a second of the at least one external rotary wheel having blades having blades disposed in said first left rotor chamber and at least one right set of holes communicating between said main port and said first left rotor chamber, said right body assembly has a first of the at least one fixed wheel, said right rotor has a first of the at least one internal rotary wheel having blades and a first of the at least one external rotary wheel having a first set of blades and a segment ring having a second set of blades, each of said second set blades has a C shape tip, a second of the at least one external rotary wheel having blades having blades disposed in said first right rotor chamber and at least one right set of holes communicating between said main port and said first right rotor chamber, said union has an internal rotary wheel having blades and one of a plurality of holes form including multiple axial non-through holes and multiple axial through holes between said left rotor and said right rotor.

3. The turbine system of claim 1, wherein the at least one subsystem has a support tower and the at least one turbine having said body assembly having a main port defined by an inlet port, an outlet port and the at least one electrical device, said left body assembly has a left rotor bore receiving said left rotor to form a first left rotor chamber to receive the at least one electrical device and a second left rotor chamber, said right assembly has a right rotor bore receiving said right rotor to form a first right rotor chamber to receive the at least one electrical device and a second right rotor chamber, said left body assembly has a first of the at least one fixed wheel said left rotor has a first of the at least one internal rotary wheel having blades with zone an inside diameter dividing said main port into a high power zone and a lower power zone between said inlet port and said outlet port, and a first of the at least one external rotary wheel having a first set of blades and a segment ring having a second set of blades, each of said second set blades has a C shape tip, a second of the at least one external rotary wheel having blades having blades disposed in said second left rotor chamber and at least one right set of holes communicating between said main port and said second left rotor chamber, said right body assembly has a first of the at least one fixed wheel, said right rotor has a first of the at least one internal rotary wheel having blades and a first of the at least one external rotary wheel having a first set of blades and a segment ring having a second set of blades, each of said second set blades has a C shape tip, a second of the at least one external rotary wheel having blades having blades disposed in said second right rotor chamber and at least one right set of holes communicating between said main port and said second right rotor chamber, said union has an internal rotary wheel having blades and one of a plurality of holes form including multiple axial non-through holes and multiple axial through holes between said left rotor and said right rotor.

4. The turbine system of claim 1, wherein the at least one subsystem has a float housing assembly having a float vessel and the at least one turbine, said float vessel has multiple hinges holders, each of said multiple hinge holders has at least one hinge hole and multiple wire holes extending to said float vessel, said float vessel has one of a plurality of structures including toroid pipe assemblies and polygonal pipe assemblies, said each of said multiple hinge holder constructed with said float vessel in one of a plurality of methods including a static method and a movable method, the at least one turbine has at least one hinge shaft movably disposed in the at least one hinge hole and one of a plurality of structures including an independent structure and a part of the at least one turbine and a part of said each of said multiple hinge holders.

5. The turbine system of claim 4, wherein the at least one turbine has said body assembly "said body assembly" has a main port defined by an inlet port, an outlet port, and the at least one electrical device, said left body assembly has a left extension, a left rotor bore receiving said left rotor to form a first left rotor chamber and a second left rotor chamber to receive the at least one electrical device, said right assembly has a right extension, a right rotor bore receiving said right rotor to form a first right rotor chamber and a second right rotor chamber to receive the at least one electrical device, said left body assembly has a first of the at least one fixed wheel in said second left rotor chamber, said left rotor has a first of the at least one internal rotary wheel having blades with an inside diameter dividing said main port into a high power zone and a lower power zone between said inlet port and said outlet port, and a first of the at least one external rotary wheel having blades disposed in said first left rotor chamber and at least one left set of holes communicating between said main port and said first left rotor chamber, and a second of the at least one external rotary wheel disposed movably in said second left rotor chamber, said right body assembly has a first of the at least one fixed wheel disposed in said first right rotor chamber, said right rotor has a first of the at least one internal rotary wheel having blades and a first of the at least one external rotary wheel having blades disposed in said first right rotor chamber and at least one right set of holes communicating between said main port and said first right rotor chamber, a second of the at least one external rotary wheel disposed in said second right rotor chamber, said left body assembly also has multiple holes between said first left rotor chamber and said left extension, said right body assembly also has multiple holes between said first right rotor chamber and said right extension, said union has an internal rotary wheel having blades and one of a plurality of holes form including multiple axial non-through holes and multiple axial through holes between said left rotor and said right rotor.

6. The turbine system of claim 4, wherein the at least one turbine has said body assembly "said body assembly" has a main port defined by an inlet port, an outlet port, at least one hinge shaft having multiple through holes and the at least one electrical device, said left body assembly has a left extension, a left rotor bore receiving said left rotor to form a first left rotor chamber to receive the at least one electrical device and a second left rotor chamber, said right body assembly has a right extension, a right rotor bore receiving said right rotor to form a first right rotor chamber to receive the at least one electrical device and a second right rotor chamber, said left body assembly has a first of the at least one fixed wheel having said left electrical stator, said left rotor has a first of the at least one internal rotary wheel having blades with an inside diameter dividing said main port into a high power zone and a lower power zone between said inlet port and said outlet port, a first of the at least one external rotary wheel disposed in said first left rotor chamber, and a second of the at least one external rotary wheel having blades disposed in said second left rotor chamber and at least one left set of holes communicating between said main port and said second left rotor chamber, said left body assembly also has multiple holes between said second rotor chamber and said left extension, said right body assembly has a first of the at least one fixed wheel disposed in said second right rotor chamber, said right rotor has a first of the at least one internal rotary wheel having blades and a first of the at least one external rotary wheel movably disposed in said first right rotor chamber, a second of the at least one external rotary wheel having blades disposed in said second right rotor chamber engaged with said left rotor and at least one right set of holes communicating between said main port and said second right rotor chamber, said right body assembly also has multiple holes between said second right rotor chamber and said right extension, said union has an internal rotary wheel having blades and one of a plurality of holes form including multiple axial non-through holes and multiple axial through holes between said left rotor and said right rotor.

\* \* \* \* \*